United States Patent [19]
Heuer

[11] 3,839,597
[45] Oct. 1, 1974

[54] INTERACTIVE MANUAL PRESET CONTROLS FOR A COLOR TELEVISION RECEIVER

[75] Inventor: Charles H. Heuer, Glencoe, Ill.

[73] Assignee: Zenith Radio Corporation, Chicago, Ill.

[22] Filed: Mar. 22, 1973

[21] Appl. No.: 344,011

[52] U.S. Cl. .................................................... 358/28
[51] Int. Cl. ................................................ H04n 9/12
[58] Field of Search ................. 178/5.4 HE, 5.4 MC

[56] References Cited

UNITED STATES PATENTS 3,374,310 3/1968 Beers ............................ 178/5.4 MC
3,648,179 3/1972 Ikegami ......................... 178/5.4 HE
3,715,463 2/1973 Matzek ......................... 178/5.4 MC

*Primary Examiner*—Albert J. Mayer
*Attorney, Agent, or Firm*—Nicholas A. Camasto; Joseph T. Downey

[57] ABSTRACT

An electrical arrangement for restricting the range of adjustment for one of a redundant pair of color potentiometer controls in a color television receiver to affect a single picture characteristic, for example, the color saturation of the picture. Dominance of the characteristic by one of the pair of controls is determined by the position of a viewer-actuated selector switch which produces either a manual or preset mode of operation. The potentiometers are mounted coaxially and their variable taps interconnected with a resistor.

5 Claims, 3 Drawing Figures

INTERACTIVE MANUAL PRESET CONTROLS FOR A COLOR TELEVISION RECEIVER

BACKGROUND OF THE INVENTION

Color television receivers generally included viewer-accessible color picture controls which provided a wide latitude of adjustment in the reproduced image. Such controls were used to compensate for signal distortion due to transmission interference, variations in station broadcast signals and individual color picture preferences. It is well known that some viewers encountered difficulty in achieving an optimized color picture or in restoring the picture after alteration by less skillful viewers, such as children.

Most present color television receivers now include an additional set of color characteristic controls for providing a simpler means of optimizing the picture. This additional set of controls is preset by the manufacturer and is normally inaccessible to the viewer, whereas the other set corresponds to the conventional viewer-operated controls. A viewer-actuated selector switch is provided for selecting the set of controls that will determine the characteristics of the color picture. In the event of difficulty, the viewer is able to optimize the color picture by actuating this selector switch, enabling the preset controls to restore the characteristics of the picture. In such receivers, the viewer has no control over the picture when in the preset mode, since the selector switch renders the accessible controls inoperative. The viewer, is therefore, unable to make adjustments according to his own personal preferences or to compensate for changes in the picture due to such effects as the aging of components. The so-called flesh tones on the reproduced image, being especially susceptible to subjective judgments, created a need for some control over the picture even when in the preset mode of operation.

One solution permits exposed viewer or manual controls to be operative, but restricted to a limited range of adjustment. When the selector switch is in the preset mode, it results in a condition of dominance as distinct from absolute control of the picture by the preset controls. This is different from the former independent operation of a dual control system since in the preset mode, the user still can make minor preferential adjustments using the normal viewer controls.

There are various techniques for providing a limited adjustment range, when in the preset mode of operation. One arrangement includes a series electrical connection of the fixed elements of two control potentiometers, one viewer accessible and one preset. When the viewer selector switch is in the preset mode, the short circuit normally across the preset potentiometer is removed and a resistor is connected in parallel with the viewer-accessible or manual potentiometer, thus diminishing its adjustment effect. Another arrangement includes a single manual potentiometer and a resistor network. When the selector switch is in the preset mode, the resistor network is connected to the potentiometer, and reduces its adjustment effect.

This invention includes an electrically parallel arrangement of potentiometers for providing mutually interactive control systems. Irrespective of the position of the selector switch, both controls can affect the picture to some limited degree, which has the benefit of allowing one to always be able to ascertain by observation the effect of any adjustment of either potentiometer. This feature will be discussed in greater detail later. The reduction of the range of effectiveness of one potentiometer when in a mode dominanted by the other may be achieved by interconnecting their variable taps with an appropriate electrical network. The controls remain mutually interactive but the nondominant control is capable of providing only a fine adjustment to the setting of the dominant control. By suitably choosing the values of the potentiometers and the interconnecting network, the range of fine adjustment may be tailored. In the preferred embodiment of this invention, the interconnecting network is a single fixed resistor, which produces the desired range limiting effect of the viewer accessible or manual potentiometer in the preset operational mode. This, in combination with the simple mechanical arrangement, produces a system with economic advantages as well as improved accessibility for service personnel. The coaxial arrangement of potentiometers allows convenient placement of the preset and manual adjustment locations in close proximity on the color television set. Thus, the location marked for a viewer-accessed control such as color saturation, for example, also indicates the adjustment location for the corresponding preset control. This aids the viewer by allowing him to readily locate the preset controls, should the occasion arise. Any confusion which might occur should the viewer attempt to adjust the preset controls will be reduced.

OBJECTS OF THE INVENTION

The object of this invention is to provide an improved color television receiver.

Another object of this invention is to provide a color television receiver of reduced cost and improved serviceability.

SUMMARY OF THE INVENTION

This invention provides means for limiting the range of adjustment for one of a pair of mutually interactive and electrically parallel potentiometer controls affecting a single characteristic of chrominance of the image of a color television receiver when the viewer, by means of a selector switch, has designated the other potentiometer control to be dominant.

BRIEF DESCRIPTION OF THE DRAWINGS

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF THE PREFERRED EMBODIMENT

Figure 1:
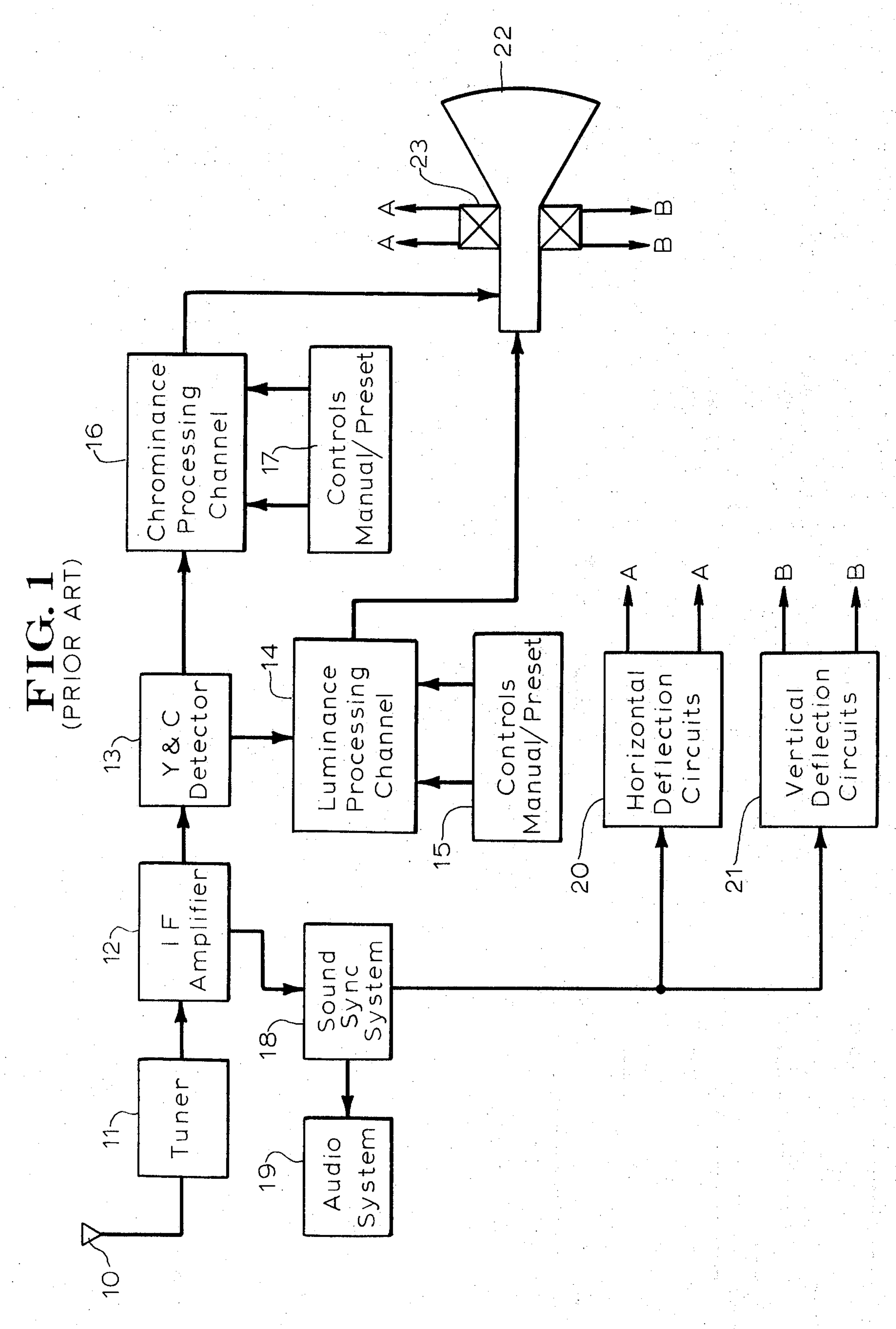
FIG. 1 (PRIOR ART)
FIG. 1 is a schematic representation of a prior art television receiver embodying preset and manual control circuits in both the luminance and chrominance processing channels.

The color receiver of FIG. 1 has an antenna 10 coupled to a tuner 11 which includes the usual radio frequency amplifying and heterodyning stages for selecting a desired broadcast program signal and for translating that signal to an appropriate intermediate frequency. After amplification in an intermediate frequency amplifier 12, the signal is applied to a luminance and chrominance detector 13 where the luminance, or Y, component of the program signal is derived for application to a luminance processing channel 14. Various characteristics of luminance, such as brightness and contrast, are affected by a set of controls 15 which are capable of preset or manual operation. The controlled luminance signal is then applied to the appropriate electrodes of a conventional three-gun color cathode ray tube 22.

The chrominance, or C, component of the signal derived in detector 13 is delivered to a chrominance processing channel 16. Various characteristics of chrominance, such as tint and saturation, are affected by a set of controls 17, which are also capable of preset or manual operation. The controlled chrominance signals are then delivered to the appropriate electrodes of a color cathode ray tube 22.

A portion of the output signal from IF amplifier 12 is delivered to a sound-synchronization system 18, where 1) the sound, or audio, portion of the broadcast program signal is derived and delivered to an audio system 19 for processing in the usual manner, and 2) the synchronization signal information in the broadcast program signal is developed and delivered to both the horizontal and vertical deflection circuits 20 and 21, respectively. The deflection circuits develop appropriate horizontal and vertical deflection voltages for application to a deflection yoke 23 located on the neck of picture tube 22. The connection points A—A and B—B indicate the respective horizontal and vertical deflection winding connections on yoke 23. The deflection voltages are maintained in proper synchronization by the synchronizing signal information from sound-sync system 18. For simplicity, the details of scansion of the screen of tube 22 as well as the circuitry for maintaining convergence of the three beams in three-gun color tube 22 are omitted.

Figure 2:
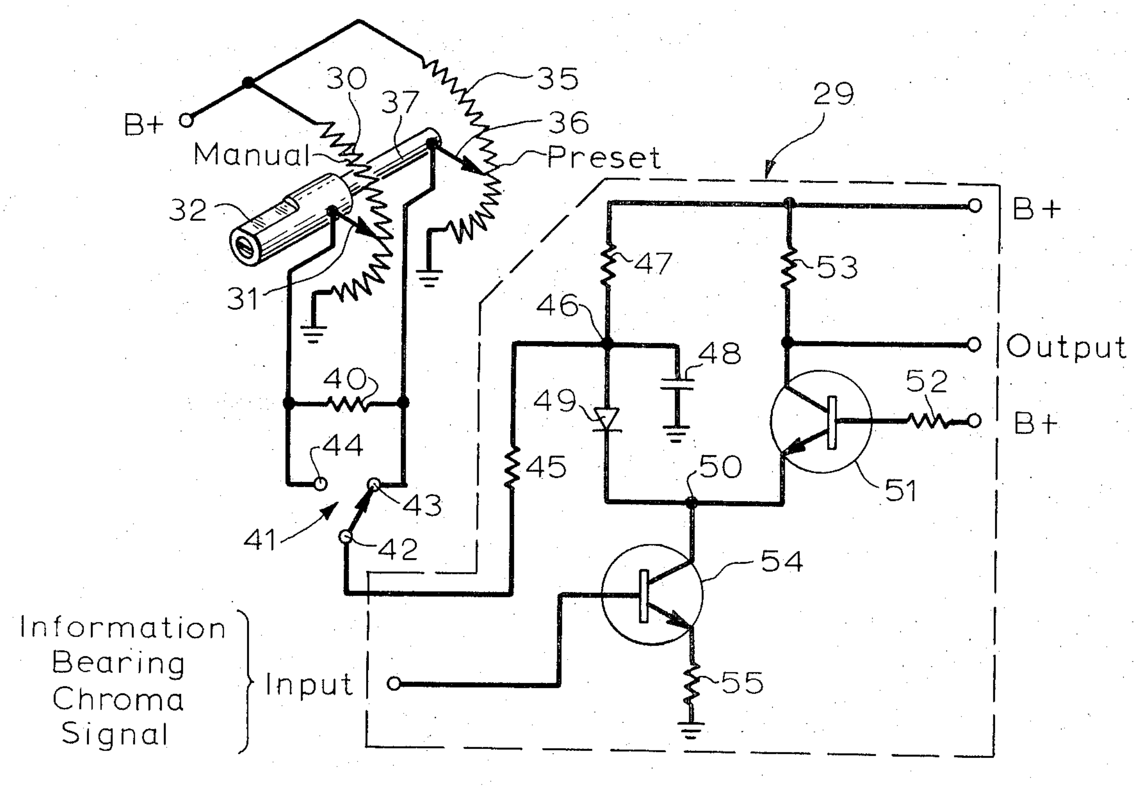
FIG. 2 represents a pictorial-schematic of a color saturation control circuit constructed in accordance with the invention.

In FIG. 2, a pictorial-schematic for a color saturation or level control constructed in accordance with the invention is shown. The control potentiometers affect a change in the DC voltage applied to a stage 29 (shown enclosed by the dashed line) of a signal amplifier in the chrominance processing channel 16, which effectively controls the gain of the stage. A potentiometer 30, which is the manual or viewer-accessible control, has a variable tap 31 insulated from, but driven by a shaft 32. Shaft 32 has a conventional flat portion for reception of a conventional knob for viewer adjustment. A coaxially mounted potentiometer 35 is the normally inaccessible preset control and has a variable tap 36 insulated from, but driven by a slotted shaft 37. Slotted shaft 37 may be engaged by an adjustment tool, after removal of the knob (not shown) from shaft 32. Potentiometers 30 and 35 are connected in parallel between a source of B+ voltage and chassis ground. A range-limiting resistor 40 is connected between variable taps 31 and 36 of potentiometers 30 and 35, respectively. A selector switch 41, has a movable contact 42 alternately engageable with fixed contacts 43 and 44, and which are respectively connected to variable taps 36 and 31 of the potentiometers. Connection with contact 44 represents the manual operating position and contact 43, the preset operating position. Movable contact 42 is connected in series with a resistor 45 to a junction 46. Junction 46 is connected to B+ voltage through a resistor 47, to ground through a capacitor 48 and to the anode terminal of a diode 49. The cathode terminal of diode 49 is connected to a junction 50, which is also connected to the emitter of a transistor 51 and the collector of a transistor 54. A source of B+ voltage is applied to the base of transistor 51 through a resistor 52 and to its collector through a resistor 53. The emitter of transistor 54 is connected to ground through a resistor 55. The chroma signal input to stage 29 is applied to the base of transistor 54 and the output of stage 29 taken from the collector of transistor 51.

Diode 49 and transistor 51 form a differential-type amplifier with transistor 54 functioning as a current source. The gain of amplifier stage 29 is proportional to the DC voltage applied to junction 46. The voltage at junction 46 is itself proportional to the voltage developed across the portion of the dominant potentiometer's resistance, between ground and its variable tap, modified by the voltage developed across the nondominant potentiometer's resistance, between ground and its variable tap, and applied through resistor 40.

Assume the preset mode of operation with movable contact 42 connected to contact 43. The range-limiting resistor 40 attenuates the voltage effect at junction 46 due to manual potentiometer 30. The resistance values of the potentiometers are normally chosen to produce a 20–30_db_ operational range extending from 10_db_ above a given reference level to complete extinguishment of the chroma signal. The limiting resistor 40 is chosen so that adjustment of the manual potentiometer in the preset mode of operation produces only a 2–3 _db_ change in chroma signal. Thus, the voltage at junction 46 and subsequently the color level or saturation is predominantly responsive to the setting of potentiometer 35.

In the manual mode of operation, contact 42 of selector switch 41 is connected to contact 44. This mode is analagous to the preset mode with manual potentiometer 30 now becoming the dominant control. In either operating mode, the voltage at junction 46 affects the gain of amplifier stage 29, and therefore, the magnitude of the output signal at the collector of transistor 51. After further processing in chrominance processing channel 16, this chroma signal controls the color display on picture tube 22.

While variations in resistance values may be made, the particular ratio of interconnecting resistance to potentiometer resistance used produces a significantly range-limited, mutually-interactive color saturation or level control system. While a significant range-limiting effect is observed, adjustment of the nondominant control produces sufficient change in the display to enable an operator to make small subjective corrections. The preset controls are normally inaccessible, but they are available for adjustment should the need or desire arise. The coaxial arrangement of the preset and manual controls not only provides a cost advantage, but aids serviceability and viewer adjustment by providing a common location. Thus, for example, the designation "color level" on the receiver indicates both the manual control and the access location for the corresponding preset control. Thus, any viewer confusion which might occur should he attempt to adjust the factory preset controls, will be minimized.

Figure 3:
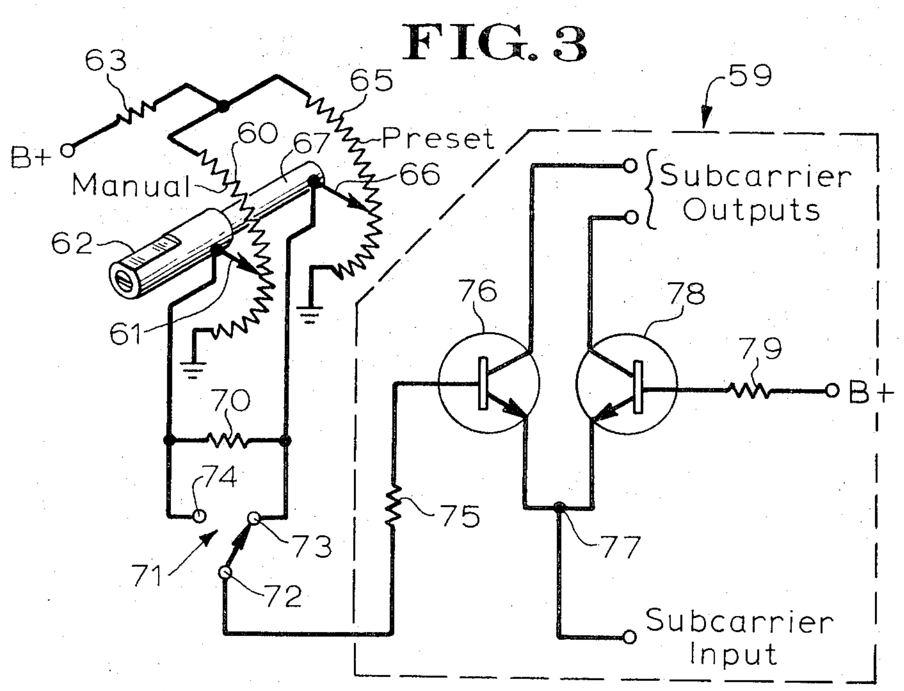
FIG. 3 represents a pictorial-schematic of a color hue control circuit constructed in accordance with the invention.

In FIG. 3, a pictorial-schematic for a color hue control constructed in accordance with the invention is shown. The control potentiometers provide DC voltage for varying the current in the output branches of an amplifier 59 (shown enclosed in dashed lines for changing the regenerated subcarrier phase) in the chrominance processing channel 16. A potentiometer 60 which is the manual or viewer-accessible control, has a variable tap 61 insulated from, but driven by a shaft 62. Shaft 62 has a conventional flat portion for reception of a conventional knob (not shown) for viewer adjustment. A potentiometer 65 is the normally inaccessible preset control and has a variable tap 66 insulated from, but driven by a slotted shaft 67. Slotted shaft 67 may be engaged by an adjustment tool after removal of the knob from shaft 62. Potentiometers 60 and 65 are connected in parallel between chassis ground and a resistor 63, the other end of which is connected to a source of B+ voltage. A range-limiting resistor 70 is connected between the variable tap 61 and 66 of potentiometers 60 and 65, respectively. A selector switch 71 has a movable contact 72 alternatively engageable with a pair of fixed contacts 73 and 74 which are respectively connected to variable taps 66 and 61 of the potentiometers. Movable contact 72 is connected in series with a resistor 75 to the base of transistor 76. The emitter of transistor 76 and the emitter of a transistor 78 are connected together at a junction 77 which constitutes the input for a 3.58 MHz subcarrier signal. A source of B+ voltage is applied to the base of transistor 78 through a resistor 79. The collectors of transistors 76 and 78 form the output branches of amplifier 59.

The interconnection of transistors 76 and 78 forms a differential-type amplifier arrangement. The input signal to this amplifier, a 3.58 MHz continuous wave from a crystal oscillator (not shown), is applied to junction 77. The DC voltage applied to the base of transistor 76 determines the relative current in the output branches formed by the collectors of transistors 76 and 78. A variation of this relative branch current in combination with different impedance loads (not shown) results in a change of the relative phase of the regenerated subcarrier outputs. The voltage at the base of transistor 76 is proportional to the voltage developed across the portion of the dominant potentiometer's resistance between ground and its variable tap, modified by the voltage developed across the other potentiometer between its variable tap and ground and applied through resistor 70.

Assume the preset mode of operation with movable contacts 72 connected with contact 73. The range-limiting resistor 70 attenuates the voltage effect at the base of transistor 76 due to manual potentiometer 60. The resistance values of the potentiometers are normally chosen to produce a 60°–90° range in demodulation angle. The limiting resistor 70 is chosen so that adjustment of the manual potentiometer in the preset mode of operation produces only a 10° change in demodulation angle. Thus, the voltage at the base of transistor 76 and subsequently the demodulation angle which produces the color hue or tint is predominantly responsive to the setting of potentiometer 65.

In the manual mode of operation, contact 72 of selector switch 71 is connected to contact 74. Again, this mode is analagous to the preset mode, but with manual potentiometer 60 becoming the dominant control. In either operating mode, the voltage at the base of transistor 76 affects the relative branch current for the subcarrier output signals of amplifier 59 which subsequently affects the phase of the regenerated subcarrier signals with respect to the phase of the information bearing chroma signal. Changing this phase relationship results in an altered angle of demodulation of the chroma signal in chrominance processing channel 16 which changes the color hue or tint of the display on picture tube 22.

While variations in resistance values may be made, the particular ratio of interconnection resistance to potentiometer resistance used produces an interactive, yet significantly range-limited color hue control system. In a similar manner as for the color saturation or level control, the advantages of this control arrangement improve serviceability and benefit the viewer by minimizing confusion.

A simple means for limiting the range of effectiveness in a color television receiver has been described. The simple circuit and physical arrangement of the controls also provide cost advantages and improved serviceability.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. In a color television receiver having a color cathode ray tube, signal processing means including a chrominance channel for supplying color information and a luminance channel for supplying luminance information to said color cathode ray tube, said receiver having preset and manual operating modes:

- a viewer-accessible color potentiometer control coupled to said chrominance channel for affecting one characteristic of chrominance in the display when the receiver is in the manual operating mode;
- a presettable color potentiometer control, normally inaccessible to the viewer and coupled to said chrominance channel in an electrically parallel arrangement with the viewer accessible control, for affecting the same characteristic of chrominance in the display when the receiver is in the preset operating mode;
- a viewer activated switch selecting between said preset and manual operating modes of the receiver; and means, coupled between the variable taps of said potentiometer controls, limiting the effectiveness of the viewer-accessible control providing restricted adjustment range with the viewer-accessible control when the receiver is in the preset operating mode.

2. In a color television receiver as described in claim 1 wherein said means limiting the effectiveness of the viewer-accessible color potentiometer control in the preset mode comprises a single resistor interconnected between said variable taps of said potentiometer controls.

3. In a color television receiver as described in claim 2 wherein said potentiometer controls are coaxially mounted.

4. In a color television receiver as described in claim 2 wherein said chrominance characteristic is the color level or saturation, wherein the potentiometer resistance is chosen to provide a normal operational range of 20–30*db*, relative to a given reference level, and wherein said resistor produces a restricted adjustment range of 2–3*db* in the chroma signal relative to the preset control setting.

5. In a color television receiver as described in claim 2 wherein said chrominance characteristic is the color tint or hue, wherein the potentiometer resistance is chosen to provide a normal operational range of 60°–90° in demodulation angle and wherein said resistor produces a restricted adjustment range of 10° relative to the preset control setting.

* * * * *